United States Patent
Maezawa et al.

[19]

[11] Patent Number: 6,145,024
[45] Date of Patent: Nov. 7, 2000

[54] INPUT/OUTPUT OPTICAL FIBER SERIAL INTERFACE LINK THAT SELECTIVELY TRANSFERS DATA IN MULTIPLEX CHANNEL PATH MODE OR HIGH SPEED SINGLE CHANNEL PATH MODE

[75] Inventors: Hirofumi Maezawa, Ashigarakami-gun; Kazuhiko Ninomiya, Hadano, both of Japan

[73] Assignees: Hitachi, Ltd., Tokyo; Hitachi Information Technology Co., Ltd., Kanagawa-ken, both of Japan

[21] Appl. No.: 09/087,936

[22] Filed: Jun. 1, 1998

[30] Foreign Application Priority Data

Jun. 6, 1997 [JP] Japan ................................ 9-149346

[51] Int. Cl.[7] .................................................... G06F 13/00
[52] U.S. Cl. ............................ 710/14; 710/11; 710/30; 710/38; 710/51; 385/24
[58] Field of Search .................................. 710/11, 16, 30, 710/38, 51, 14; 370/401, 476; 359/115, 128; 385/24

[56] References Cited

U.S. PATENT DOCUMENTS

| | | | |
|---|---|---|---|
| H967 | 9/1991 | Mariotti ................................. | 370/537 |
| 5,237,561 | 8/1993 | Pyhalammi ............................ | 370/244 |
| 5,241,409 | 8/1993 | Hill et al. ............................... | 359/128 |
| 5,241,961 | 9/1993 | Henry ..................................... | 607/32 |
| 5,291,485 | 3/1994 | Afify et al. ............................. | 370/476 |
| 5,313,323 | 5/1994 | Patel ....................................... | 359/115 |
| 5,790,527 | 8/1998 | Janky et al. ............................ | 370/330 |
| 5,793,770 | 8/1998 | John et al. .............................. | 370/401 |
| 5,825,949 | 10/1998 | Choy et al. ............................. | 385/24 |
| 5,940,771 | 8/1999 | Gollnick et al. ....................... | 455/517 |
| 5,973,809 | 10/1999 | Okayama ............................... | 359/128 |

FOREIGN PATENT DOCUMENTS 6-187277  8/1994  Japan .

*Primary Examiner*—Thomas C. Lee
*Assistant Examiner*—Tammara Peyton
*Attorney, Agent, or Firm*—Mattingly, Stanger & Malur, P.C.

[57] ABSTRACT

An input/output data transfer system capable of integrating input/output data transfer on a plurality of input/output interface cables into data transfer on a single serial input/output interface cable for substantially reducing the number of input/output interface cables required for a host computer system. A multiplexer channel device is provided with a plurality of channels which serve as logical channels corresponding to conventional physical channel paths from a viewpoint of an operating system running on the host computer system. A multiplexer port device is provided with a plurality of input/output ports on a switching device or input/output device, each of these channels and ports shares a large-capacity input/output interface, and a channel path multiplexing function is performed for enabling frame-by-frame multiplexing and simultaneous input/output operations on plural channels. For each of logical channel paths multiplexed on the large-capacity link, a logical connection is established to provide compatibility with conventional input/output operations, and a data transfer capacity bandwidth of the large-capacity link is always allocated optimally to one or more active channels.

18 Claims, 6 Drawing Sheets

PHYSICAL CHANNEL PATH TABLE

| PHYSICAL CHANNEL NUMBER | 0 | | | | | | | | 8 | | | | | | | | 16 | | | | | | | | 24 | | | | | | | 31 |
|---|---|---|---|---|---|---|---|---|---|---|---|---|---|---|---|---|---|---|---|---|---|---|---|---|---|---|---|---|---|---|---|---|
| 0 | P | C | O | N | F | | | | S | C | O | N | F | | | | PTYPE | | | | | | | | C H P I D | | | | | | | |
|  | I | E | r | r | F | r | r | r | r | r | r | r | r | r | r | r | T | Y | P | E | r | r | r | r | C | H | P | I | D | | |
| 1 | | | | | | | | | | | | | | | | | | | | | | | | | | | | | | | | |
| 2 | | | | | | | | | | | | | | | | | | | | | | | | | | | | | | | | |
| ... | | | | | | | | | | | | | | | | | | | | | | | | | | | | | | | | |
| 1FF | | | | | | | | | | | | | | | | | | | | | | | | | | | | | | | | |

FIG. 6

INPUT/OUTPUT OPTICAL FIBER SERIAL INTERFACE LINK THAT SELECTIVELY TRANSFERS DATA IN MULTIPLEX CHANNEL PATH MODE OR HIGH SPEED SINGLE CHANNEL PATH MODE

BACKGROUND OF THE INVENTION

1. Field of the Invention

The present invention relates to computer input/output data transfer system, and more particularly to an input/output data transfer system which is capable of transferring data between channel devices and input/output devices over transmission lines having different transfer capacity bandwidths in a multiplexed or divided data form for enhancing the utilization rate of the transmission lines and permitting selection of various data transfer rates.

2. Description of Related Art

Recently, there is a trend in the art of mainframe computer systems, away from a parallel input/output interface for transferring data in parallel over a plurality of copper wire lines, toward a serial input/output interface which provides a higher capacity of data transfer and longer distance connections over optical fiber cables. The serial input/output interfaces prevalent at present are capable of transferring data over a distance on the order of tens of kilometers by means of fiber links having a data transfer capacity of 200 megabits/second and repeaters including switching devices.

With advances in optical transmission technology, the channel capacity of data transfer and transmission distance have increased significantly. Today, it is rather difficult to clearly distinguish a channel input/output interface from a local area network (LAN) using techniques such as a token ring, FDDI (Fiber Distributed Data Interface), ATM (Asynchronous Transfer Mode), etc. In current mainframe computer system architecture, there coexist various kinds of channel devices. Examples include an open-network direct-access channel arrangement allowing data transfer over a distance on the order of hundreds of kilometers, an optical fiber open-connection channel interface allowing high capacity data transfer at a rate of gigabits/second, a system interlinking interface for data transfer between computer systems, etc. Therefore, there is a high demand for higher-speed and longer-distance transmission capabilities in an input/output interface for connecting input/output devices including external storage devices with a host computer.

In an arrangement based on a conventional technique related to channels in the above-mentioned serial input/output interface, for example, a switched point-to-point topology using 200-Mbps optical fiber links and switching devices is employed to provide star-networking connections of channels and input/output devices. In this configuration in which all the links have the same capacity of data transfer, a connection is established between nodes at both ends so that a maximum data transfer capacity of each transfer line can be used in input/output operations.

Since costs of components operating at a rate of gigabits/second have decreased substantially in recent years, there is an increasing demand for efficient, smooth expansion of conventional input/output interface facilities to improve input/output processing performance meeting enhanced system performance. At present, it is desirable to provide a technique for implementing a large-capacity interface for higher performance of input/output operations in a novel manner different from such conventional performance improvement methods that ensure input/output throughput by increasing the number of channels, developing new high-performance channel interfaces, etc.

With respect to enhancing input/output operation speed, increasing the data transfer capacity per link is more advantageous since the ratio of input/output operation time in a certain period of actual data transfer is made larger thereby, i.e., since the amount of data to be transferred per input/output operation is made larger. However, the command instruction processing time and the end-of-execution report processing time required before and after data transfer are not reduced substantially, and the answer waiting time increases where a transmission distance of an interface is longer. In a situation where the amount of data to be handled per input/output operation is rather small, an advantageous effect corresponding to an increase in data transfer capacity per link cannot be attained with conventional input/output interface protocols.

A conventional technique for the efficient use of data transfer capacity per link is found in Japanese Non-examined Patent Publication No. 187277/1994, for example. In this conventional technique, link sharing by means of frame multiplexing is performed for input/output devices which can operate in parallel simultaneously on the same link. In another conventional technique of this kind, packets are multiplexed by means of frame multiplexing in data transfer through a plurality of networked nodes, or in another technique, interfaces of links are multiplexed virtually or actually by means of time-division/frequency-division multiplexing. Still more, there is another conventional data transfer protocol technique intended for increasing data transfer speed by means of simplifying overhead processing before and after data transfer.

At present, futuristic input/output host computer systems including new input/output interfaces and protocols thereof are under development. However, it will take a period of more than several years to ten years to establish the technology for realizing such futuristic input/output systems including input/output devices. In consideration of reliability, compatibility with upper-level applications, etc. as well as input/output performance, it is impracticle to rebuild entire computer systems over and over again to meet rapid, continuous advances in optical transmission technology. Therefore, stepwise improvements in performance, which are different from those accomplished by ordinary advancements in system architecture expansion, are important and needed at present in a CPU and input/output interface of host computer systems.

For enhancement in computer system performance, it is increasingly in demand to improve input/output processing performance together with CPU performance. In most of the recent mainframe computer systems having high-performance channel capabilities, the number of accommodated channels is increasing appreciably, i.e., 256, 512 or more channels are connected to each computer system.

An optical fiber serial input/output interface cable is far lighter in weight and easier to handle than a copper-wire parallel input/output interface cable. However, the increase in numbers of channels and diversification in interface route arrangement using switching devices, as well as the installation and maintenance of input/output interface cabling, give rise to considerable problems.

For simplifying installation and maintenance of input/output interface cabling, a method of bundling interface cables by means of trunk cables, etc. has been devised. However, this method is disadvantageous in that its application to existing facilities located across floors in a building or across buildings is rather difficult. A method of replacement with the latest-technology input/output interface capable of high-speed large-capacity data transfer is also disadvantageous in that input/output devices including channel devices must be modified or replaced with new ones.

SUMMARY OF THE INVENTION

It is therefore an object of the present invention to obviate the above-mentioned disadvantages of the conventional techniques by providing an input/output data transfer system which can integrate input/output data transfer on a plurality of input/output interface cables into data transfer on a single serial input/output interface cable using high-capacity interface multiplexer channel paths, thereby making it possible to substantially reduce the number of input/output interface cables required for a computer system.

Another object of the present invention is to provide an input/output data transfer system which permits using conventional input/output devices as they are without modification and which does not require alteration in conventional input/output operational sequences of an operating system in integration of input/output interface cables.

Recent advances in optical transmission technology have made it possible to implement a longer-distance input/output interface through switching devices and repeaters. It has also been proposed to further prolong an input/output interface by connecting it directly or indirectly with a network by using channel devices. However, such a longer-distance input/output interface decreases the utilization rate of the transmission lines as compared with conventional data transfer methods. In adopting the communication protocol of the next generation, it is therefore important to take into account the factors which will improve the utilization rate of the transmission lines and ensure communication quality of the data to be transferred. Until the next-generation communication protocol is established and becomes prevalent, it is necessary to provide an effective means for solving the problem mentioned above.

Accordingly, it is another object of the present invention to provide an input/output data transfer system which allows program resources, including an operating system available in an existing computer system, to be used as is without the need for adding high-cost repeaters and modifying input/output devices on a large scale for protocol conversion.

One serial data transfer multiplexing technique is time-division multiplexing. However, time-division multiplexing is disadvantageous in that when some of the multiplexed paths on an input/output interface are inactive, a data transfer capacity of the input/output interface cannot be utilized efficiently by the remaining multiplexed paths. Another technique is frequency-division multiplexing, wherein an input/output interface cable can be utilized simply by a plurality of paths and there is no technical restriction imposed on the transfer capacity of each path. Therefore, frequency-division multiplexing is an advantageous technique in terms of multiplexing performance. However, the frequency-division multiplexing is disadvantageous in that the costs of the optical transmission devices must be reduced down to a level lower than the costs of all of the optical cables to be eliminated.

It is another object of the present invention to circumvent the above-mentioned disadvantages of the serial data transfer multiplexing techniques by providing an input/output data transfer system using a packet multiplexing interface on the basis of transfer data framing, which is advantageous in that hundreds of input/output interface lines per system can be realized at a low cost. The present invention also aims to provide a low-cost input/output data transfer system which has interface protocol compatibility with existing program resources, thereby eliminating costs which would otherwise be required for program modifications.

Mainframe computers have been evolving into higher-performance, more compact systems with significant improvements in required installation space and power consumption. For further enhancement of system performance, there is a tendency to increase the number of input/output interfaces to be connected per system, resulting in a substantial increase in the occupancy ratio of the input/output subsystems in terms of installation area and physical requirement. As to channel devices in particular, since they are connected directly with optical interface cables, the installation of as many optical interface connector circuits as there are number of channel paths is required. In some mainframe computers, a majority of the system facilities are occupied by input/output-interface-related parts.

It is still another object of the present invention to overcome the above-mentioned disadvantage by providing an input/output data transfer system which allows a mainframe computer to exploit its full capabilities using a small number of channels with high-performance channel devices and which is capable of reducing the number of system channels while utilizing existing input/output devices without modification thereof.

In accomplishing the foregoing objects of the present invention and according to one aspect thereof, there is provided an input/output data transfer system with channel devices of input/output processing devices connected to port devices of input/output devices through an optical-fiber serial interface link for performing data transfer through said serial interface link by sending/receiving frames, which comprises a multiplexer channel device capable of serving as a plurality of channel devices for said input/output processing devices and a multiplexer port device capable of serving as a plurality of ports for said input/output devices. Preferably, the multiplexer port device is connected through a high-bit-rate large-capacity optical link selectively operated in either of a multiple logical channel path mode for frame-multiplexing data transfer or a high-speed single channel path mode for single-channel path data transfer.

According to another aspect of the present invention, the foregoing objects thereof are accomplished by providing an input/output data transfer system having a high bit rate large-capacity optical link wherein the number of channel paths to be multiplexed on the opitcal link is limited so as not to exceed the product of the data transfer capacity and a multiplex level of the optical link. The optical link is understood to be between channel devices of input/output processing devices and port devices of input/output devices. Accordingly, a plurality of logical connections are established on each of the multiplexed channel paths.

Accordingly to another aspect of the present invention, the foregoing objects thereof are accomplished by providing an input/output data transfer system having a high bit rate large capacity optical link wherein data transfer is performed in two modes. In one mode, a single channel path mode, data transfer is performed using a data transfer protocol for a single-path physical link operation. In another mode, a multiple logical channel path mode data transfer is performed on plural logical channel paths using different protocols, respectively, for frame-multiplexing data transfer.

Still further, the foregoing objects of the present invention are accomplished by providing the following modifications and variations therein which are not described in the amended claims.

In one embodiment of the present invention, there is provided an input/output data transfer system in which channel devices of input/output processing devices are connected to input/output devices through an optical-fiber serial interface link, wherein data transfer is performed by sending/receiving frames. With a medium-capacity optical link connected between conventional channel devices and input/output ports of input/output devices, a high-bit-rate large-capacity optical link can be formed to provide a large capacity of data transfer. In particular, a switching device is equipped for a dynamic switching operation on plural links having different capacities of data transfer, and channel devices are arranged as a multiplexer channel device that can serve as plural channel paths for the operating system. Frame-multiplexing data transfer is performed between each multiplexer port device of the switching device and each multiplexer channel device, or frame-multiplexing data transfer is performed between each multiplexer port device of the input/output device and each multiplexer channel device and between each multiplexer port device of the input/output device and each multiplexer port device of the switching device.

The input/output data transfer system in the present invention, for providing compatibility with channel paths on conventional input/output interfaces, performs frame-multiplexed serial interface connection control on the basis of logical channel paths on the same link. Data transfer paths between channel devices and input/output ports of input/output devices are connected via channel paths on the medium-link and logical channel paths on the large-capacity link.

On the large-capacity link in the present invention, data transfer using different protocols is carried out by means of mapping conventional protocol frames as payloads in a data transfer protocol frame formed on the medium-capacity link. Through the use of this well-known technique of protocol conversion, the large-capacity link in the present invention can be recognized as a single link by the system, which is advantageous in system operation and maintenance. Still further, in the present invention, each frame-multiplexed logical channel path is independently controlled for connection, and in the same fashion as for conventional channel path connection control, it is possible to establish data transfer path connections and ensure a bandwidth necessary for data transfer. That is, according to the present invention, for ensuring the bandwidth necessary for data transfer and carrying out connection control, a multiplex level of logical channel paths on the large-capacity optical link is limited so that a total data transfer capacity corresponds to a bandwidth of the optical link. Thus, a plurality of connections on each logical channel path can be provided by a simplified logic circuit arrangement for frame multiplexing. With these connections, it is possible to provide an operation bandwidth of the same capacity on the large-capacity link in logical connections as the operating bandwidth using the total capacity of the medium-capacity link.

In accordance with the present invention, there is provided an input/output data transfer system which enables data transfer using different protocols on serial interfaces having different capacities of data transfer. A large-capacity input/output interface is used as a single high-speed channel path by allocating the total data transfer capacity of the interface to logical channel paths that are active on the large-capacity link. More specifically, in the present invention, the multiplex level is limited except when the frames are transmitted with equal priority and assigned to plural channel paths. Multiplexer channel paths are established without limiting the data transfer capacity per channel path. In the situation where there are no other logical channel paths on the large-capacity link for one channel of the multiplexer channel device and one port of the multiplexer port device, it is possible to perform data transfer using a full bandwidth for a capacity of data transfer. Furthermore, advantageous expandability can be provided by using a protocol for completing single-link operation in an arrangement that repeaters and switching devices are equipped for extending the connection distance of the large-capacity interface.

In the present invention, when data transfer is performed using different protocols, protocol conversion is carried out readily at high speed by a switching device for which protocol conversion is required. For this purpose, each internal-frame link address on the medium-capacity link is mapped directly in a frame header on the large-capacity link. In routing a frame received from each link to each internal port at the multiplexer port of the switching device, if the frame header contains a link address as the information representing a port number of each internal port, the internal port number corresponding to the link address can be used as a switching ID number in an internal switching matrix. This makes it possible to implement internal processing of each switching device easily without the need for substantial modification to a conventional arrangement. Therefore, when using the data transfer protocol on the large-capacity link according to the present invention, a physical link address representing a single link and a logical channel path link address representing an ID number of each multiplexed logical channel path are provided in the frame header.

At channel devices and port devices connected through the medium-capacity interface, each channel path of connection in the computer system is recognized using a link address. Similarly, in the present invention, a logical channel path on the large-capacity interface is recognized at each channel of the multiplexer channel and each port of the multiplexer port. This means that a majority of the system resources can be operated as in the case of using the medium-capacity interface only, except parts related to the linkage between the multiplexer channel and the multiplexer port and parts that recognize the large-capacity interface as a single link for system operation and maintenance.

In the present invention, the multiplexer channel device comprises a link error detector circuit for recognizing a link error on all of the channels and a master channel discrimination circuit for identifying a channel to be recovered in execution of link recovery. A link recovery operation is carried out only when a channel microprogram recognizes a master channel. Therefore, if an error is detected on a single channel only, other channels than that subjected to error detection and recovery are put in a state waiting for link recovery without performing the link recovery operation after error recognition. In this arrangement, the channel microprogram can utilize a conventional link fault processing procedure for the medium-capacity link, and a channel busy state of an input/output processing device can be handled by the operating system in the same manner as it is in a conventional arrangement.

In the multiplexer channel device according to the present invention, an optical interface driver connected with a large-capacity optical link is mounted in a channel package, which is physically different from a conventional channel package having its medium-capacity optical link interface driver for each channel. Conventionally, the type of channel device is recognized according to the input/output configuration information containing the channel path type for each channel path defined in the operating system. As contrasted, in the present invention, the type of channel device is recognized by making reference to an inherent type code which indicates a physical package type in a physical channel path table. In this arrangement, from a viewpoint of the operating system, each channel of the multiplexer channel device seems to be the same as the channel on the medium-capacity optical link. The configuration information containing the channel operation mode type, etc. is distinguished from the physical channel device information, and each physical channel path number is used for control of each channel.

If the wrong configuration definition is made by mistake or a mismatch of the channel path type is made due to improper installation of a channel device, an error is detected through comparison between the channel device information and the channel path type configuration information. By referencing the physical channel path table available in the present invention, it is possible to significantly reduce the channel device information read time which occupies a majority of the processing time required for error detection, thereby allowing an increase in the channel path online processing speed. Still further, according to the present invention, it is possible to locate a fault producing part in each link of the high-bit-rate optical link through analysis of the link error logout information and physical channel path table information corresponding to each channel path.

The above and other objects, features and advantages of the present invention will become more apparent from the following description of embodiments with reference to the accompanying drawings.

BRIEF DESCRIPTION OF THE DRAWINGS

FIG. 6 is a diagram showing a physical channel path table structure.

DETAILED DESCRIPTION OF THE PREFERRED EMBODIMENTS

Figure 1:
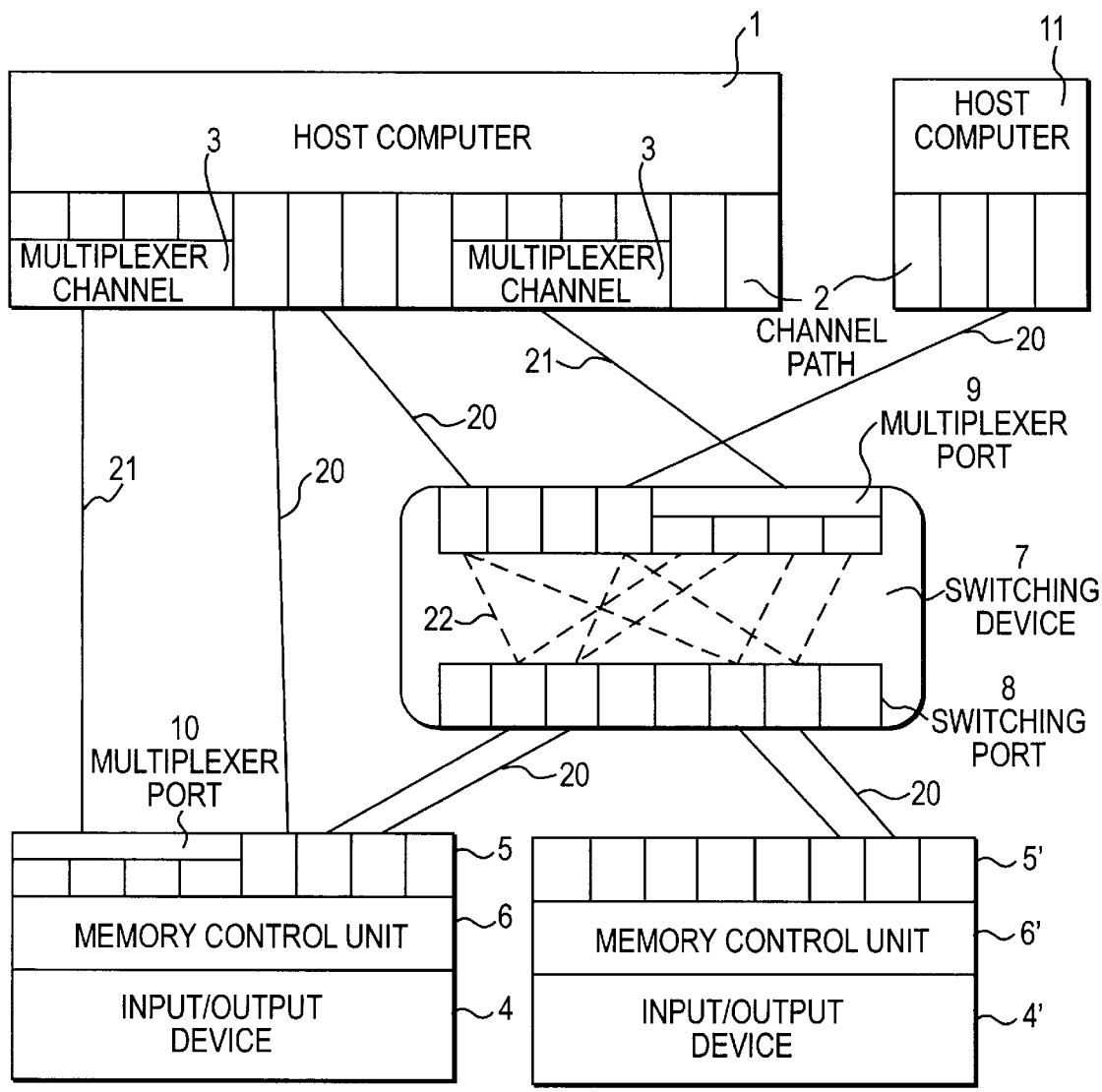
FIG. 1 is a block diagram showing a schematic configuration of an input/output data transfer system according to a preferred embodiment of the present invention.

The present invention will now be described in detail by way of example with reference to the accompanying drawings.

In FIGS. 1 to 4, there are shown host computers 1 and 11, channel paths 2, multiplexer channels 3, an input/output device 4, an input/output ports, a memory control unit 6, a switching device 7, a switching port 8, multiplexer ports 9 and 10, optical fiber links 20 and 21, a port-to-port logical connection path 22, a main memory 30, a multiplexer channel device 31, an interface driver 33, a main memory interface control circuit 34, a channel 35, a multiplex/distribution control circuit 36, an external interface protocol control circuit 37, a link connection control circuit 38, a channel path control circuit 50, a data transfer buffer 51, a fetch data register (FDR) 60, store data register (SDR) 61, a transmitted frame register (TFR) 62, a received frame register (RFR) 63, data interface lines 64 to 67, a control interface line 68, a memory control unit or matrix switch 70, a multiplexer port device 71, an interface driver 73, an internal interface control circuit 74, a port 75, a multiplex/distribution control circuit 76, an external interface protocol control circuit 77, and a link connection control circuit 78.

In the input/output data transfer system according to a preferred embodiment of the present invention, input/output devices having different types of input/output interfaces are mixed together, and data transfer is carried out using different protocols for serial input/output interfacing. The input/output data transfer system in the present preferred embodiment comprises host computers, each of which is equipped with a plurality of channel devices connectable with input/output interfaces having different capacities of data transfer, and a switching device or input/output devices equipped with a plurality of ports having different protocols and different capacities of data transfer.

More specifically, as shown in FIG. 1, the input/output data transfer system in the present preferred embodiment includes a host computer 1 which has channel paths 2 for accommodating a medium-capacity optical fiber links 20 and multiplexer channels 3 for accommodating large-capacity optical fiber links 21 (e.g., optical fiber links having a capacity approx. four times as large as that of the channel paths 2). Also, another host computer 11 is representatively included, which has channel paths 2 for accommodating medium-capacity links 20.

The system has an input/output device 4 that has a plurality of input/output ports 5, including a multiplexer port 10 shown to be directly connected with host computer 1 through link 21. One of the non-multiplexer ports 5 is shown to be connected to a channel 2 of host computer 1 through medium capacity optical fiber link 20. The input/output device 4 also has a memory control unit 6.

The system further includes an input/output device 4' which non-multiplexer input/output ports 5' and a memory control unit 6'.

The switching device 7 has a plurality of switching ports on opposite sides of the device with a switching matrix disposed therebetween. A multiplexer port 9 is shown to be on the host computer side. Opposite thereto, as shown on the input/output device side of switching device 7, are non-multiplexer switching ports 8 provided for establishing interconnections between the host computer and other computers, such as host computer 11 (the interconnection link is not shown in FIG. 1) and also connections between the host computers and the input/output devices 4, 4'.

In the above-mentioned configuration, the host computer 1 performs data transfer with the input/output devices 4 and 4' using many more links 20, 21 than that which are shown (the number of links is reduced in the figures to a representative number for the purpose of maintaining clarity), directly or through the switching device 7 and also performs data transfer through the switching device 7 with the other host computer 11. Since the medium-capacity optical fiber links 20 and the large-capacity optical fiber links 21 are mixed together and all used by the host computer 1, data on plural channel paths 2 multiplexed by the multiplexer channels 3 can be transmitted/received through the links 21. Furthermore, in the system shown in FIG. 1, data transfer can be performed using the multiplexer port 10 for multiplexing the memory control input/output ports 5 of the input/output device 4 and the multiplexer port 9 for multiplexing the switching ports 8 of the switching device 7.

The multiplexer channels 3 can serve as a single channel path or a plurality of channel paths for an operating system running on the host computer. The number of channel paths to be multiplexed is limited by the physical channel device structure and the total data transfer rate on each channel path. In the present embodiment, the number of channel paths to be multiplexed is determined so that a data transfer capacity of the link 21 is not exceeded, i.e., up to four channel paths are multiplexed on the link 21 whose data transfer capacity is at least four times larger than that of the link 20. For instance, a multiplex level is limited to '5' for the case where the transmission speed of the medium-capacity link 20 is 200 Mbits per second and the transmission speed of the large-capacity link 21 is 1062.5 Mbps.

In general, the medium capacity optical fiber links, as the term is used herein, are at present embodied by conventional fiber optic links having an approximate data transfer rate of 200 Mbps (megabytes per second). On the other hand, the large capacity fiber optic links, as the term is used herein, at present have a data transfer rate that ranges from 1 to 2 Gbps and including 4 Gbps (gigabytes per second). In the future the data transfer rates may increase, but the relation between the medium capacity and large capacity optical fiber links in the present invention is what is referred to herein. Accordingly, as another example of this relation, a large capacity optical fiber of 2 Gbps, can be used in the multiplexed transmission of 8 medium capacity fiber optic links of 200 Mbps (8×200 Mbps=1600 Mbps, which is less than 2 Gbps) so that the relation holds.

The details of the limitation of the multiplex level in the present preferred embodiment will be described hereinafter with particular reference to FIG. 5. In a situation where the data transfer protocol used on a large-capacity link having multiplexed channel paths is different from that used on a conventional medium-capacity link, it is necessary to impose a limitation on the multiplex level so that a data transfer capacity equivalent to that of a medium-capacity link can be adequately ensured on the large-capacity link even with the addition of an overhead load which is required for multiplexing the channel paths. Thus, compatibility with conventional functionality can be provided. With data transfer using a protocol different from that used on a conventional medium-capacity link, it is of particular importance to always ensure a data transfer capacity that is larger than a predetermined limit of the large-capacity link 21 for each of the multiplexed channel paths 2.

The switching device 7 enables data transfer with the multiplexer channel 3 of the host computer 1 through the multiplexer port 9 and with the multiplexer port 10 of the input/output device 4 (connection link is not shown in FIG. 1). In the switching device 7, port-to-port logical connection paths 22 are set up for data transfer. The multiplexer port 9 multiplexes or distributes data transfer frames between one or more switching ports 8 and the link 21, and establishes dynamic or static logical connection with one or more other ports through one or more internal logical paths 22, thereby allowing data transfer between plural links 20 and 21 having different transfer capacities. Further, when switching device 7 is equipped with a plurality of multiplexer ports 9, it can transfer data from one of the links 21 to another through one or more internal logical paths for the plural multiplexer ports.

The multiplexer port 10 of the input/output device 4 can serve as a memory control input/output port 5 and it can also multiplex or distribute data transfer frames for plural input/output ports 5. Moreover, for the case where the switching device 7 is set up in dynamic or static connection states between multiplexer ports by means of the switching mechanism, the multiplexer port 10 of the input/output device 4 can establish inter-multiplexer-port connection through the switching device 7.

According to the input/output data transfer system in the preferred embodiment mentioned above, there is provided an advantage that the number of input/output interface cables can be reduced substantially. That is, a plurality of input/output interface cables used for data transfer can be integrated into a single serial input/output interface cable. From a standpoint of the entire computer system, it is possible to considerably reduce the number of input/output interface cables. The larger the scale of the computer system, the more the input/output interface cables can be reduced, i.e., a greater reduction in input/output interface cables can be achieved in proportion to the number of existing input/output interface cables with respect to the entire computer system.

Further, according to the input/output data transfer system of the preferred embodiment mentioned above, compatibility with conventional input/output interfaces can be provided that are integrated with the input/output interface cables. To be more specific, by means of channel path multiplexing between the host computer and the switching device in combination with conventional input/output interfacing, conventional input/output devices can be used without modification. In addition, since the multiplexer channel 3 is made up of an integrated group of conventional channel paths 2 from the viewpoint of the operating system, it is not required that the operating system be made conscious of the use of the multiplexer channel 3. Therefore, in the operating system, it is not necessary to modify the control functionality for the input/output interfacing.

Furthermore, according to the input/output data transfer system of the preferred embodiment mentioned above, an advantage is provided in that an existing computer system installation can modified at low cost. More specifically, all that is required is to install the multiplexer channel device 3 on the host computer and the multiplexer port on the input/output device or the switching device. That is, by the replacement/addition of each circuit package of multiplexer channel and port devices, the existing program resources in the host computer can be used without modification. It is therefore possible to easily install components embodying the invention as required without stopping the system operation. Accordingly, while continuing service operation, the existing functionality in the host computer can be easily expanded. It is particularly advantageous that alteration in the existing computer system installation is not required.

Still further, according to the input/output data transfer system in the preferred embodiment mentioned above, there is provided an advantage that high-speed input/output interfacing can be supported. Particularly, for the case that the multiplexer channel device 3 of the host computer and the multiplexer port device 10 of the input/output device are connected directly together without a switching device or connected via a repeater only, a full bandwidth of the large-capacity input/output interface can be used in a single-channel-to-single-port connection. Thus, the links 21 can be used as single high-throughput input/output interfaces.

Figure 2:
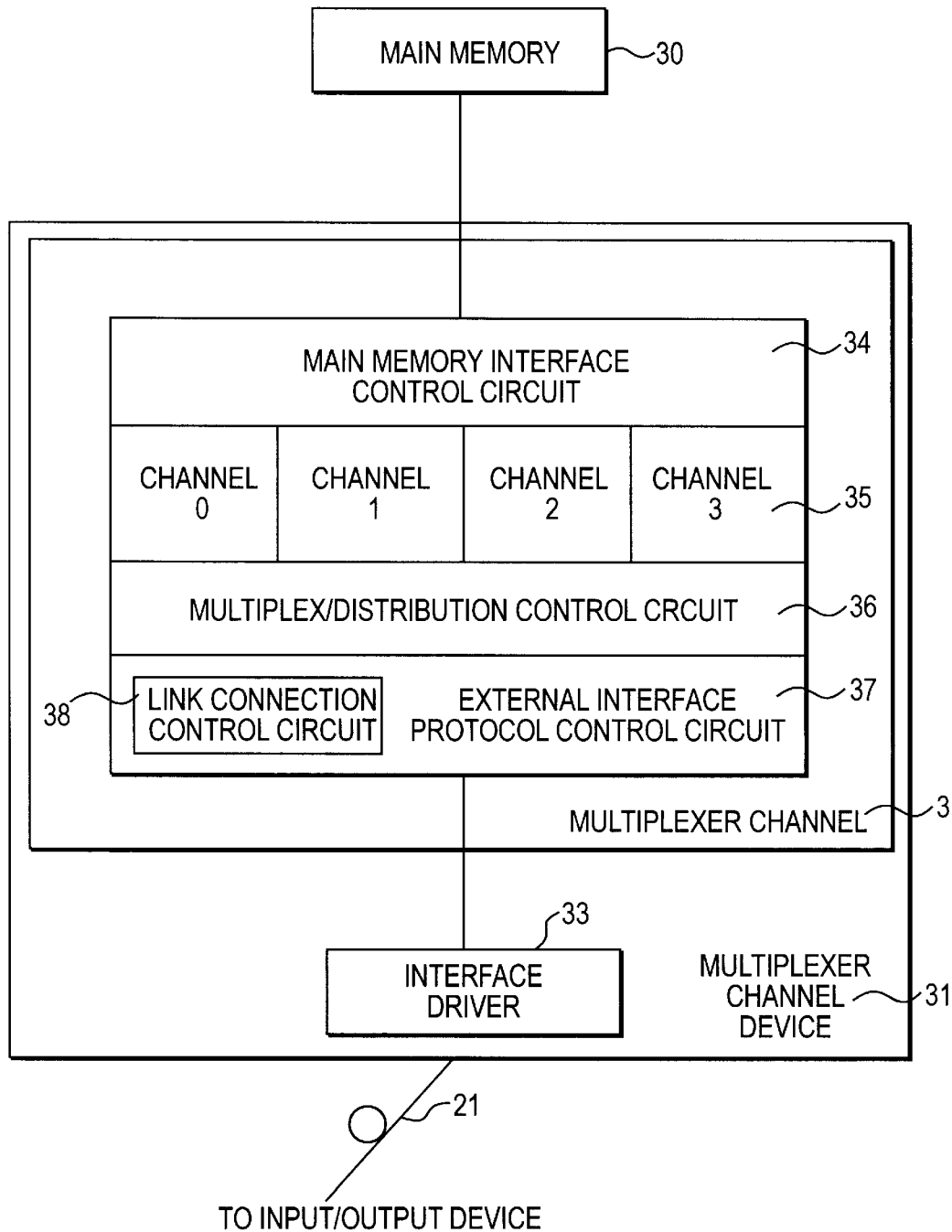
FIG. 2 is a block diagram showing a schematic configuration of a channel device.

Referring to FIG. 2, there is shown an arrangement of a multiplexer channel device 31 for multiplexer channel 3. A description of the multiplexer channel device 31 follows.

In a preferred embodiment of the present invention, the multiplexer channel device 31 includes multiplexer channel 3 and an interface driver 33 for optical fiber interfacing. In FIG. 2, the multiplexer channel 31 is arranged in a single package which supports four channel paths.

The multiplexer channel 3 is embodied by an arrangement that includes a channel-specific microprocessor that reads out a channel command from main memory 30, transfers data from/to the main memory 30, and writes the result of the executed channel command into the main memory 30. In this manner, data transfer with the input/output device or the other host computer is performed through the interface driver 33 over the optical fiber link.

The multiplexer channel 3 further includes external interface protocol control circuit 37 connected with the optical interface driver 33, multiplex/distribution control circuit 36 for multiplexing/distributing data transfer frames, four channels 35, and main memory interface control circuit 34 for controlling data transfer with the main memory 30.

The multiplex/distribution control circuit 36 in the multiplexer channel 3 multiplexes transmitted frames from each of channels '0' to '3' and sends them to the interface driver 33 under direction of the external interface protocol control circuit 37. If the multiplex/distribution control circuit 36 receives a request for frame transmission from two or more channels at the same time or it receives a request for transmission during processing of frame transmission requested by any channel, a plurality of requests from the channel 35 are not accepted for serializing the transmitted frames. In this case, when the external interface protocol control circuit 37 switches to a frame transmission request waiting state from a frame transmission busy state, the multiplex/distribution control circuit 36 accepts a request for frame transmission according to cyclic priority.

The interface driver 33 converts an electric signal of the transmitted frames into an optical signal, which is then sent through an optical fiber link 21. In a frame received by the interface driver 33, there is provided header information containing a channel number identifier. According to a channel number of each received frame identified by the multiplex/distribution control circuit 36, each received frame is distributed to each channel. Details of the header information and channel number identifier in a received frame will be described later with particular reference to FIG. 5 showing a frame structure.

The multiplexer channel 3 provides a feature wherein the full bandwidth of the optical interface transfer capacity is allocated for frame transfer on each channel 35. Between transmitted frames on each channel 35 or between received frames on each channel 35, multiplexing is performed for a transmitted or received frame on another channel. Unlike time-division allocation in which the capacity of the data transfer on the optical interface for each channel path is unchangable, the above-mentioned arrangement enables the multiplexer channel 3 to serve as a high-speed channel path using the full bandwidth of the transfer capacity on the optical interface when the multiplexer channel 3 serves as a single channel path. Further, when the multiplexer channel 3 serves as plural channel paths, compatibility with conventional connection control for each channel path is provided using logical connection control on the large-capacity optical interface for link connection control information on each channel path. In this operation, logical connection control is carried out by the external interface protocol control circuit 37 and a link connection control circuit 38.

Conventionally, each channel device is provided for each physical input/output interface. While controlling each physical input/output interface, each channel device is managed by a host computer system according to channel path configuration information for input/output interfacing. In such a well-known arrangement as AMIF (ACONARC Multiple Image Facility) for MLPF (Multiple Logical Processor feature), input/output operations for plural LPARs (Logical PARtitions) sharing channel paths are carried out on a single channel path. In this arrangement, each channel path becomes busy for a certain input/output operation while an input/output operation for another LPAR is in progress, and a new request for an input/output operation is not accepted until a link-connected state is released. On each channel path, a total capacity of data transfer is allocated to each input/output operation.

In accordance with the present preferred embodiment, the multiplexer channel device 31 is provided with a plurality of channels 35 which serve as logical channels corresponding to conventional physical channel paths from a viewpoint of the operating system running on the host computer. Each of these channels shares a physical input/output interface, and a channel multiplexing function is performed for enabling frame-by-frame multiplexing and simultaneous input/output operations on plural channels. Moreover, in the multiplexer channel device 31, the data transfer capacity bandwidth for input/output interfacing can always be optimally allocated to one or more of the active channels.

In order for each channel 35 of the multiplexer channel 3 to provide compatibility with conventional physical channel paths for the operating system, it is necessary that each channel 35 be able to complete an input/output operation independently and conventional input/output devices can be used without modification. It is also necessary to carry out input/output interface control so that data overrun will not occur at any input/output device port or channel 35 during data transfer or that data will not be stacked on a switching port.

Since one of the channel paths multiplexed on the large-capacity input/output interface is connected with the medium-capacity input/output interface through port-to-port logical connections in the switching device, it is required for the multiplexer channel 3 to provide a data transfer capacity equivalent to that of the medium-capacity input/output interface for preventing frame stacking at the multiplexer port of the switching device. If a data transfer capacity occupied per channel path on the large-capacity input/output interface is smaller than that of the medium-capacity input/output interface, frames may be stacked at the multiplexer port in a read operation from an input/output device to cause degradation in performance, resulting in occurrence of an overrun in the input/output device. On the contrary, for the case where the data transfer capacity occupied per channel path on the large-capacity input/output interface is larger than that of the medium-capacity input/output interface, frames may be stacked at the multiplexer port in a write operation from a channel but the occurrence of an overrun can be prevented since the channel 35 of the multiplexer channel 3 can recognize the multiplexed link connections. However, since more frames may be stacked at the multiplexer port as the difference increases between the data transfer capacity per channel path on the large-capacity input/output interface and that of the medium-capacity input/output interface, it is necessary to provide a larger receiving buffer on the large-capacity input/output interface receiving side of the multiplexer port.

The large-capacity input/output interface in accordance with the present invention can also serve as a single high-speed channel path. Therefore, for an active channel path, the total data transfer capacity of the interface can be allocated at all times. This signifies that a plurality of channel paths are used to transfer frames with equal priority and the multiplexer port is provided with a large-sized receiving buffer. It is however adequate to provide the same buffer capacity as that of the multiplexer channel. In this arrangement, the large-capacity input/output interface of the present invention can realize multiplexer channel paths at a limited multiplex level without resorting to a limitation being placed on the data transfer capacity per channel path.

For ensuring compatibility with conventional channel paths, it is also necessary to manage link connection control information for each channel path in the same manner as in a conventional arrangement scheme. For this purpose, in the present preferred embodiment, each channel 35 performs logical connection control under direction of the link connection control circuit 38 so that a logical connection can be established/released for each of the channel paths multiplexed on the large-capacity input/output interface.

Figure 5:
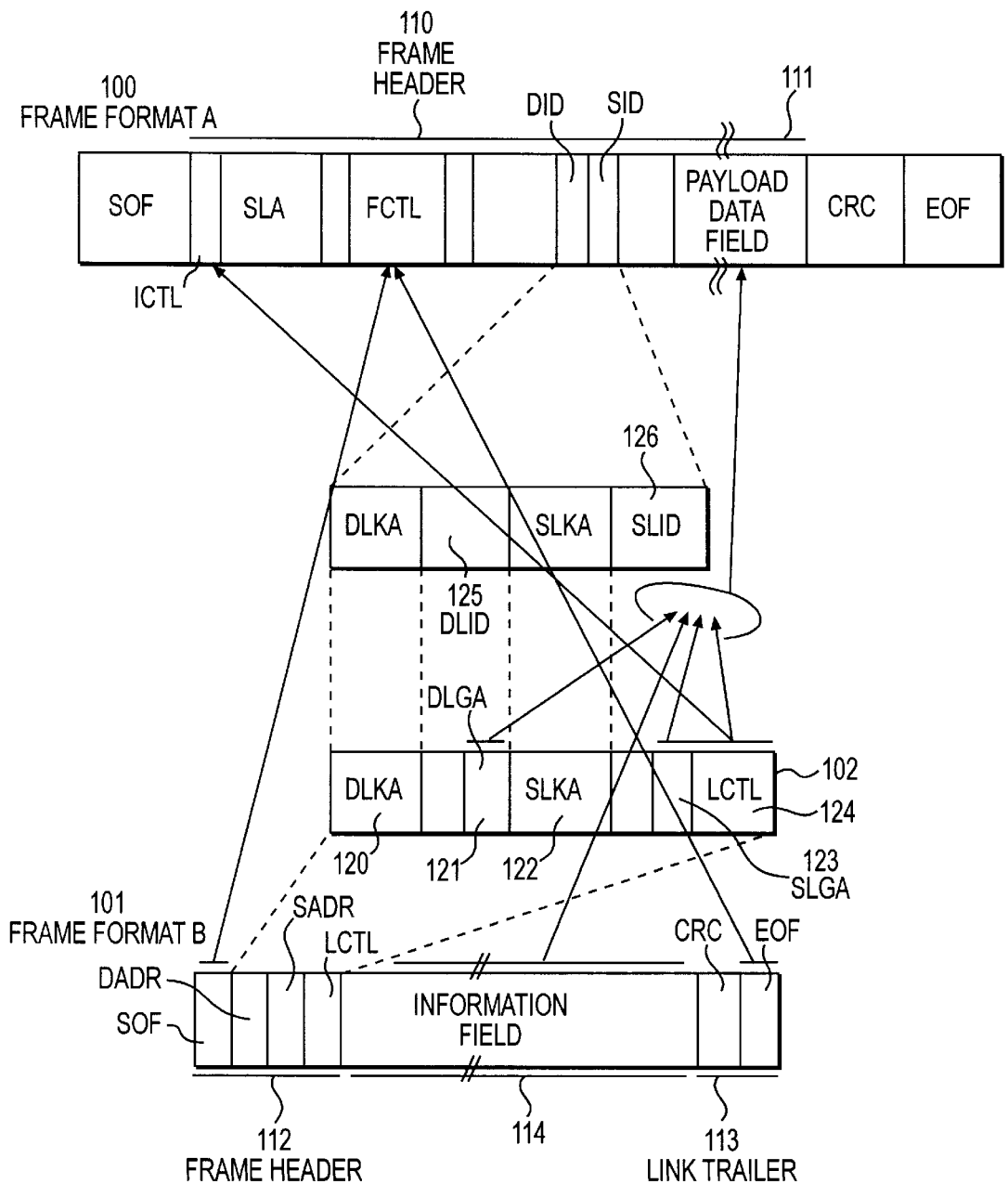
FIG. 5 is a diagram showing a transfer frame structure and also showing block conversion in a serial input/output interface.

The following is a description of the details of the logical connection control mentioned above with particular reference to FIG. 3, which shows a block diagram of the multiplexer channel configuration and FIG. 5, which shows a schematic diagram of the transfer frame structure and also block conversion performed on the serial input/output interface.

Figure 3:
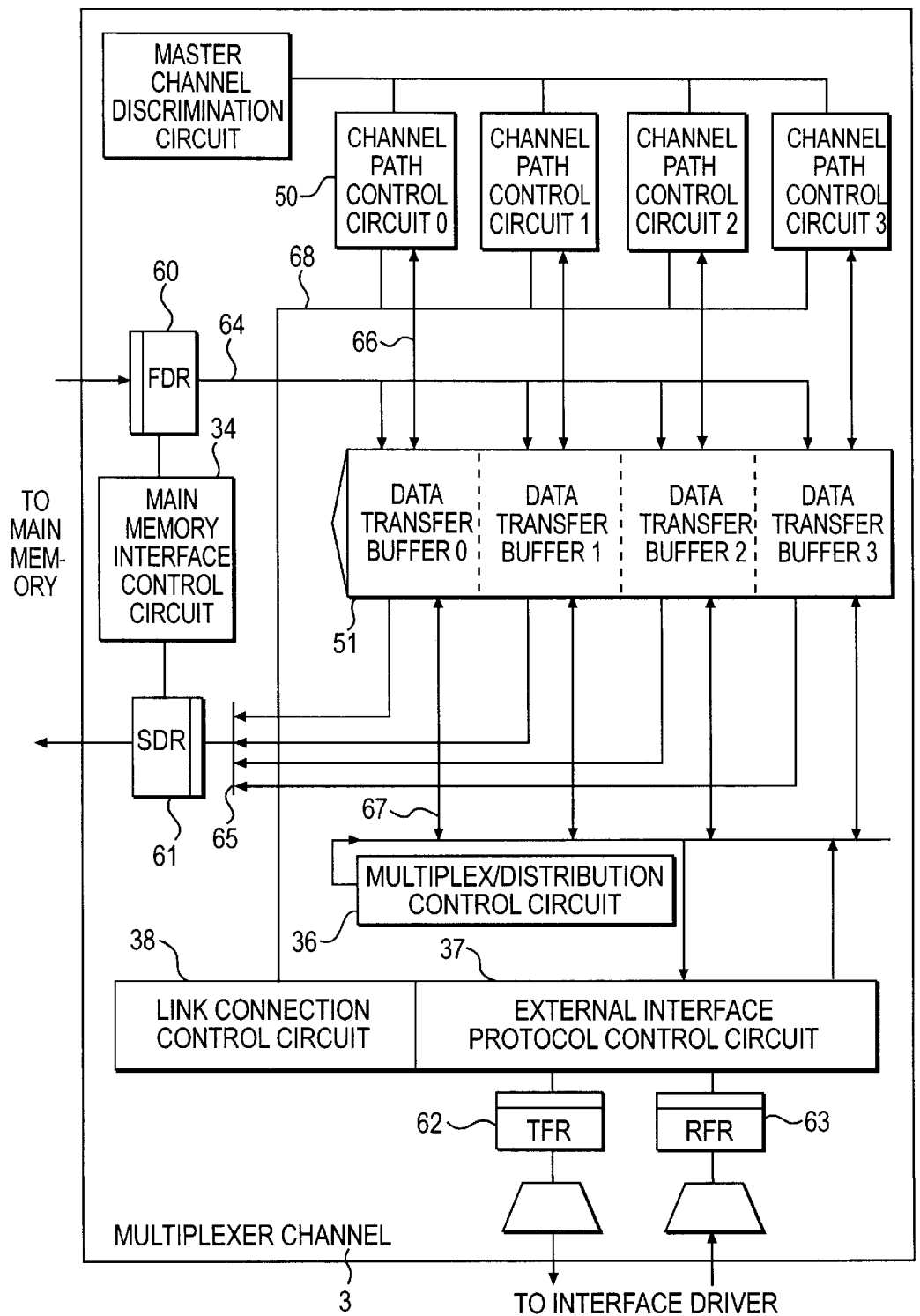
FIG. 3 is a block diagram showing a logical structure scheme of a multiplexer channel device.

Referring to FIG. 3, the multiplexer channel 3 includes a data transfer buffer 51 for buffering a difference in the data transfer operation speed between the input/output interface and the main memory interface. Data held in the main memory is written to an input/output device through the external interface, and data held in an input/output device is read into the main memory through the external interface. Serving as a data cache for input/output interfacing, the data transfer buffer 51 shares data transfer between channel path control circuit 50 (corresponding to each channel in the multiplexer channel) and the main memory through data paths 64 to 66. The data transfer buffer 51 also shares frame transfer between the channel path control circuit 50 and the input/output devices through data paths 66 and 67. In the multiplexer channel 3 shown in FIG. 3, the channel path control circuit 50 and the data transfer buffer 51 correspond to four channel paths provided as multiplexer channels respectively. The channel path control circuit 50 is logically partitioned into circuits '0' to '3', and the data transfer buffer 51 is logically partitioned into buffers '0' to '3'.

Under direction of the main memory interface control circuit 34, FDR 60 (fetch data register) receives write data from the main memory. Then, through the data path 64, the write data is stored into the data transfer buffer 51. Thereafter, under direction of the external interface protocol control circuit 37, the write data is transferred from the data transfer buffer 51 to TFR 62 (transmitted frame register) through the data path 67. On the data path 67, multiplexing of transmitted data is carried out by the multiplex/distribution control circuit 36, which is embodied by a selector, for example as shown. The logically partitioned buffers in the data transfer buffer 51 are shared by the logically partitioned circuits in the channel path control circuit 50, i.e., the logically partitioned data transfer buffers '0' to '3'0 are controlled by the logically partitioned control circuits '0' to '3'.

As for the logical partitioning of the data transfer buffer 51, a plurality of logical schemes may be used according to the scale of logic and other conditions for implementation. In the preferred embodiment, there is provided a logical partition scheme in which four equal partitions are formed and only the channel path control circuit '0' has a buffer pointer usable for all of the buffers. This logical partition scheme is preferred since its logic scale is rather small and the logical resources can be used efficiently in a single-channel-path operation. In the multiplexing of transmitted data by the multiplex/distribution control circuit 36, each request for data transmission from the four data transfer buffers '0' to '3' is selected according to the frame transmission permission granted by the external interface protocol control circuit 37. Upon receiving transmitted data from the data transfer buffer 51, the external interface protocol control circuit 37 adds a frame header to the data and converts it into a frame for transmission with a delimiter to the external interface according to the control information given by the link connection control circuit 38. Each transmitted data frame held in the TFR 62 (transmitted frame register) is modulated to provide code suitable for optical fiber transmission, which is then sent to the interface driver.

Upon receiving a data frame through the external interface, the interface driver converts it into an electric signal for decoding. Then, after decoding, the received data frame is stored into RFR 63 (received from register). For the received frame, the external interface protocol control circuit 37 checks which one of the channel path control circuits '0' to '3' is related to it. Further, the link connection control circuit 38 or related channel path control circuit 50 checks the validity of the received frame. For a certain kind of received frame, only the link connection control circuit 38 may be used to examine the connection information managed by each channel path control circuit and check the validity of the received frame. To ensure compatibility of the channel path operation from a viewpoint of the operating system, each channel path control circuit manages each received frame in the same manner as in the case where the individual medium-capacity optical interface is connected for each channel path.

In the above-mentioned arrangement, the link connection control circuit 38 shown in FIG. 3 detects connection information corresponding to each channel path in the received frame so that each channel path control circuit can make judgment by means of a control signal 68. The link connection control circuit 38 also checks the validity of the received frame according to its kind. When the external interface protocol control circuit 37 judges which channel path is related to the received frame, the multiplex/distribution control circuit 36 stores data into a corresponding logically partitioned buffer in the data transfer buffer 51 according to the result of the judgment. Then, the data stored in the data transfer buffer 51 is transferred to the main memory 30 through the data path 65 and SDR 61 (store data register).

Figure 4:
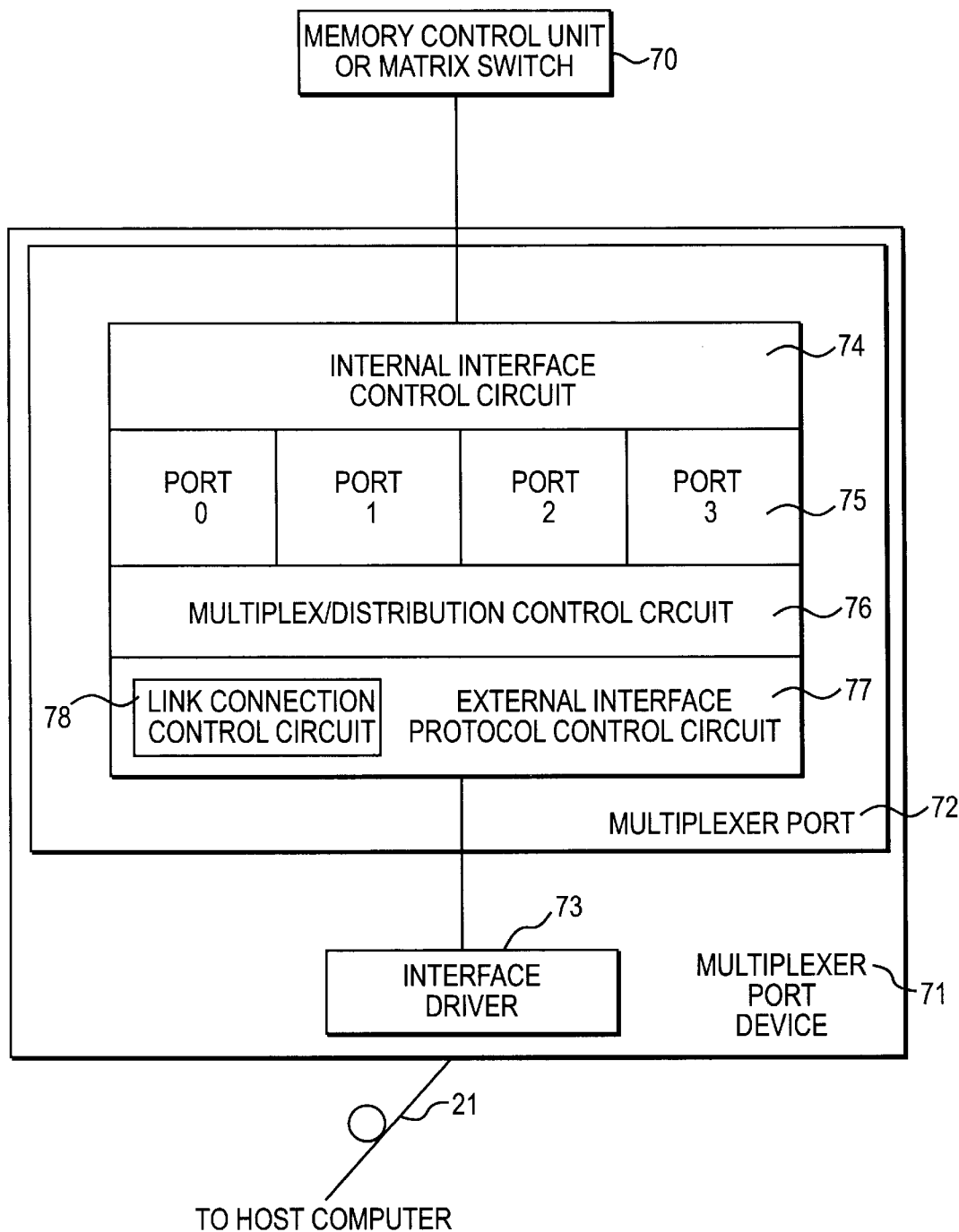
FIG. 4 is a block diagram showing a schematic configuration of a multiplexer port device.

Next is a description of the configuration of the multiplexer ports 9, 10 respectively provided on the input/output device 4 and the switching device 7, with particular reference to FIG. 4.

Referring to FIG. 4, each multiplexer port device 9, 10 is shown as a multiplexer port device 71 comprising multiplexer port 72 and interface driver 73. The multiplexer port 72 is provided with a plurality of ports 75. Each of the ports 75 performs data transfer with the upper-level memory control unit 6 (in the case of input/output device 4) or matrix switch 70 (in the case of switching device 7) through interface control circuit 74 and data transfer with the input/output device or each relevant port of the logical connection paths controlled by the matrix switch in the switching device 7. At the multiplexer port 72, a multiplexing port operation is carried out for the external serial interface link 21. In this operation, multiplex/distribution control circuit 76 and external interface protocol control 77 are used for multiplexing transmitted frames from each port 75 and distributing multiplexed frames received from the external interface to each port.

The multiplexer port 72 shown in FIG. 4 has a multiplexing arrangement of four ports for operation depending on the data transfer capacity of each physical interface as in a channel device. In the switching device, since each of the ports can set up a dynamic logical connection with any of the other ports therein, data transfer on the internal interface via the matrix switch 70 is performed in the same manner as with a conventional protocol. Therefore, the multiplexer port 72 uses conventional functionality for the operation of the matrix switch 70 and achieves dynamic connection control of the switching. Further, protocol conversion between the internal interface link 22 and external interface link 21 is carried out by the external interface protocol control circuit 77. Still further, the external interface protocol control circuit 77 of the multiplexer port 72 includes link connection control circuit 78, which performs connection control for multiplexed frames inherent in the external interface link 21. In this arrangement, compatibility with the conventional protocol is ensured with the chip of the multiplexer port to fully utilize conventional functionality in the switching device 7. It is therefore possible to implement port reconfiguration easily at low cost by only replacing the multiplexer port device 71.

If the multiplexer port device 71 shown in FIG. 4 is employed as a multiplexer port on any input/output device, frame multiplexing is performed instead of time-division multiplexing as in the multiplexer port on the switching device. However, unlike the multiplexer port device on the switching device, the multiplexer port device on the input/output device does not require protocol conversion for internal interfacing and it has a function for performing data transfer on the basis of "one channel to one port" while maintaining a high bandwidth on the large-capacity data transfer link in a single-channel-path operation of the destination multiplexer channel device. In the preferred embodiment, large-capacity data transfer on the basis of "one channel to one port" is not intended to use a new input/output interface using an entirely new protocol significantly different from the conventional one.

The multiplexer channel shown in FIGS. 2 and 3 and the multiplexer port shown in FIG. 4 are provided with a functional feature wherein one channel or port can make full use of the data transfer buffers in its own device. With a frame encapsulation protocol on the large-capacity link, there is no limitation on the capacity of the data transfer on the basis of "one channel to one port", and an overhead load other than that for the actual data transfer operation (e.g., input/output operation command transfer) is not substantially reduced. These multiplexer channel and port devices can ensure compatibility with conventional input/output interfacing advantageously and improve data flow control and other operations. Therefore, in an application requiring input/output operations of a large amount of transfer data, it is possible to realize a high-performance input/output interface adequately using a high bandwidth characteristic of the large-capacity link. In certain applications, as in the handling of a relatively small amount of data, the link utilization rate may be increased by the use of multiplexer channel path selection on the same link route.

As described hereinabove, the present preferred embodiment using the multiplexer channel shown in FIGS. 2 and 3 and the multiplexer port shown in FIG. 4 provides a high degree of compatibility with conventional input/output interfacing and flexibility for link operational conditions, making it possible to ensure a high level of link utilization rate in data transfer.

Referring to FIG. 5, there are shown a transfer data frame format A 100 on the large-capacity interface (optical fiber protocol frame, which can be of variable length) and a transfer data frame format B 101 on the medium-capacity interface (a conventional format). Conversion of each field per frame between these formats is indicated by arrows in FIG. 5. Each arrow direction indicates a direction of conversion from the frame format B 101 to the frame format A 100. In FIG. 5, there is illustrated an example of block conversion to be performed when a frame received from the input/output device 4 through the switching device 7 is transferred to the large-capacity interface through the multiplexer port 9. In contrast, a frame in the format A 100 from the multiplexer channel is converted by the multiplexer port 9 in the direction opposite that shown by the arrows, and then it is transferred to the medium-capacity interface through internal matrix switching in the switching device 7.

The frame format A 100 comprises an SOF (start of frame) delimiter, an EOF (end of frame) delimiter, a CRC error check code field, a frame header 110, and a payload data field 111. The frame format B 101 comprises a link header 112 containing an SOF delimiter, a DLKA (destination link address) field, an SLKA (source link address) field and an LCTL (link control) field, a link trailer 113 containing an EOF delimiter and a CRC field, and a data field 114. In the frame format A 100, since a single physical serial interface link is used, the frame header 110 is provided with a destination link address DLKA and source link address SLKA which are inherent in the link. In FIG. 5, these addresses are indicated as DADR and SADR, respectively.

A first feature of the transfer frame structure in the present preferred embodiment is that a frame in the frame format B 101 is mapped as a payload in the frame format A 100. This technique can be accomplished by any well-known method of data conversion between different protocols, and in the preferred embodiment, it is advantageous for system operation and maintenance to allow the system to recognize a single link individually. Moreover, in the present preferred embodiment wherein repeaters and switching devices for transmission distance extension are equipped between end-point nodes connected with the large-capacity interface, it is important to provide a protocol capable of completing a single-link operation.

In the frame format B 101, the SOF delimiter is classified into CSOF (connect SOF) and PSOF (passive SOF), and the EOF delimiter is classified into DEOF (disconnect EOF) and PEOF (passive EOF) for the purpose of connection control (although not shown in FIG. 5). It is indicated that a connection setup is in progress after a frame having the CSOF passes through the link until the DEOF is reached.

In conversion from the frame format B 101 to the frame format A 100, the kind of SOF/EOF in the frame format B 101 is reflected in an FCTL (frame control) field in the frame format A 100. Since the SOF/EOF in the frame format A 100 is controlled independently of the SOF/EOF in the frame format B 101, the SOF/EOF in the frame format B 101 has no effect on the link protocol for the frame format A 100. Besides, using the FCTL field in the frame format A 100, the multiplexer channel 3 and the multiplexer port 6 can carry out control by checking whether a logical connection is being established on the link, respectively. This arrangement is a second feature of the transfer frame structure in the present preferred embodiment. For a logical connection setting, in the same manner that an operating bandwidth corresponding to a total capacity of the link is ensured for the frame format B 101 on the medium-capacity interface, an operating bandwidth corresponding to the same capacity is ensured on the large-capacity interface.

A third feature of the transfer frame structure in the present preferred embodiment is that the frame header 110 in the frame format A 100 has a DID (destination identification) field and an SID (source identification) field and each of the DLKA and SLKA in the frame format B 101 is mapped directly. In this scheme, when the multiplexer port 6 performs the routing of a frame received from the link to each internal port, high-speed frame conversion can be carried out easily since the DLKA and SLKA corresponding to the internal port numbers are contained in the frame header. For the switching device, since each internal port number thereof is used as a switching identifier in the internal switching matrix, the DLKA and SLKA in the frame format B 101 which indicates respective port identifiers of the switching device can be received directly from the header in the frame format A. It is therefore possible to implement internal processing in the switching device without modification as in conventional processing.

The DID and SID fields in the frame format A 100 are also used as identifiers for the connection control mentioned above. In the case of dynamic port-to-port logical connections, since the DIS and SID fields in the frame format A 100 provide information corresponding to internal port numbers of the switching device for the DLKA and SLKA in the frame format B 101, each of the logical channel paths multiplexed on the large-capacity optical link is associated on a one-to-one basis using the DID and SID. By contrast, for static port-to-port logical connections, a unique logical channel path cannot be ensured using the DLKA and SLKA only. Where a link address is used for addressing other cascade-connected switching devices or a static connection is used for directly connecting any input/output device, a port number in a static-path-through state in the switching device is not associated with the DLKA/SLKA of the frame being transferred. Therefore, a DLID (destination logical path ID) 125 and an SLID (source logical path ID) 126 in the DID and SID fields are used for recognition of a unique logical channel path.

The DLID and SLID are only required to be unique with respect to the channels so that a physical channel number in the multiplexer channel device can be identified. It is permitted to assign a plurality of DLIDs/SLIDs to one channel. In the multiplexer port device, it is only required to ensure uniqueness with respect to ports. For dynamic port-to-port logical connections, logical channel paths can be associated on a one-to-one basis using the DLID and SLID only. However, since a unique link address related to the same switching device is determined at each port conventionally, the DID and SID fields in the present preferred embodiment contain a pair of the DLKA and DLID and a pair of the SLKA and SLID, respectively.

For a protocol on the large-capacity optical link, the DID and SID do not always indicate the same destination and source of connection as those of the link addresses in a series of data transfer control operations. The DID and SID are used as fields indicating the association required for flow control in data transfer. In the preferred embodiment, since each port in the multiplexer port reduces the load of frame conversion processing between different protocols, the mapping is made with the same destination and source of connection as those of the link addresses on the medium-capacity link.

The channel device and port device connected through the medium-capacity link recognize a connection path link in the computer system using the DLKA and SLKA in the frame format B 101. Similarly, each channel in the multiplexer channel 3 and each port in the multiplexer port 6 recognize a logical link on the large-capacity interface using the DID and SID in the frame format A100. That is, except a part related to linking with the multiplexer channel 3 and multiplexer port 6 and a part used for recognizing the large-capacity interface as a link for system operation and maintenance, most of the system resources can be operated in the same manner as for when that only the medium-capacity interface is used for connection.

The multiplexer channel 3 and multiplexer port 6 provide the same operation bandwidth as that of the transfer capacity of the medium-capacity interface for each internal channel and port, respectively. For connection control, the FCTL field is used with a pair of the DID and SID in the frame format A 100. Therefore, it is not required to modify the input/output configuration information managed by the computer operating system. That is, the transition from a conventional system environment can be implemented rather easily, and functional expansion can be made at low cost just by replacement with the multiplexer channel 3 and multiplexer port 6.

Then, in relation to connection control on occurrence of a channel interface fault, the following describes operations of the link connection control circuit 38 of the multiplexer channel and the link connection control circuit 78 of the multiplexer port device in the preferred embodiment.

Since a connection of each logical channel path on the large-capacity interface is controlled using the FCTL field, the detection of a connection error (frame validity error) is managed for each channel separately to carry out conventional recovery processing so that channels other than an erroneous channel can continue operation. If a fault occurs on the large-capacity interface optical link, error detection is made on all of the multiplexed channel paths to carry out link recovery operations. On occurrence of a bit error on the optical link, a link recovery operation is performed only on a single channel if only one frame is erroneous intermittently. However, if a character sync loss state in optical link reception occurs due to plural bit errors or a signal loss state occurs due to a decrease in received optical level, all of the multiplexed channel paths are subjected to link recovery operations from error detections. In this case, since the large-capacity optical link serves as a single link, link recovery operations may be in contention among plural channels.

Upon detection of a sync loss or signal loss state, the link recovery operation is performed by use of optical link condition control using primitive control codes that are different from the data for initializing the optical link. Until each of the end-point nodes of the link is restored to a status in which the frames can be actually transmitted/received, each channel and port connected with each node must be controlled so that no adverse effect is given to frame transmission and control code response.

As a first means for circumventing the contention of recovery operations mentioned above, there is a method of detecting an error on only one of the channels or ports. Recovery operation contention does not take place if error detection is made on a single channel or port. As a second means for circumventing recovery operation contention, there is a method of detecting an error on all of the channels or ports and performing a recovery operation on a single channel or port.

The multiplexer channel device in the preferred embodiment employs the second means for circumventing recovery operation contention. More specifically, the multiplexer channel device has a link error detector circuit for recognizing a link error on all of the channels and a master channel discrimination circuit for identifying a channel to be recovered, and a recovery operation is carried out only when a channel microprogram recognizes a master channel.

One of the reasons for employing the second means for circumventing the recovery operation contention is as follows: If error detection is performed on only one channel, then the channels other than the channel being subjected to error detection and link recovery are also put in a link recovery waiting state without error recognition. This condition has an adverse effect on link recovery time, causing any error other than a link error such as an overrun error, timeout error, etc.

Another reason for employing the second means for circumventing the recovery operation contention is as follows: For link error reporting, it is only required to provide a circuit capable of reporting to four channels with respect to one channel. The channel microprogram can utilize a conventional link fault processing procedure for the medium-capacity link, and a channel busy state of an input/output processing device can be handled on the operating system in the same manner as in a conventional arrangement. Further, since the master channel discrimination circuit for the recovery operation is provided, the channel microprogram can skip over the recovery operation steps for other than the master channel in the same manner as in a conventional sequence. In terms of hardware, only the lowest active channel number is selected as a master channel number using a channel-online one-bit register so that it is reflected in a branch condition which can be checked by the microprogram. Thus, in a small scale of logic circuit arrangement, it is possible to realize a recovery operation function.

For the above-mentioned recovery operation, it seems to be most advantageous that a master channel is checked only by the channel microprogram without using hardware. However, conventionally in order for a channel serving as an independent single channel to supervise the state of another channel, it is necessary to provide an additional processing procedure for referencing the entire channel management information. Still, in a conventional configuration, the type of offline channel may be changed dynamically depending on the operation mode, resulting in a stop state in which the microprogram can be replaced. It is therefore necessary to determine a master channel by just using an online channel. This also signifies that recovery cannot be made with a fixed-number channel.

Accordingly, in the multiplexer channel arrangement of the preferred embodiment, a small scale of logic circuit hardware and a master channel check function for the microprogram are added to provide high-level compatibility for the link fault processing, which is carried out by the microprogram conventionally.

For link fault recovery and link initialization processing, primitive control codes are used on the conventional medium-capacity optical link. On the ACONARC channel, for example, there are five kinds of control codes; IDL (idle), NOP (not operational), OFL (offline), UD (unconditional disconnect), and UDR (unconditional disconnect response). On the large-capacity optical link serving as a single link, equivalent primitive control codes are provided for initialization and recovery processing. The following describes a relationship between a logical connection and control codes IDL2, NOP2, OFL2, UD2 and UDR2 on the medium-capacity optical link and IDL1, NOP1, OFL1, UD1 and UDR1 on the large-capacity optical link.

On the ACONARC channel interface, the switching device establishes static or dynamic port-to-port logical connections. Depending on whether a static or dynamic port-to-port connection is made, it is determined whether the primitive control codes are equivalent or not between the switching ports.

For a dynamic port-to-port logical connection made in the switching device, since each switching port performs initialization independently for a destination channel or input/output port, initialization of the large-capacity optical link is carried out only between the multiplexer channel and multiplexer port. In a conventional arrangement in which the input/output devices are connected with the switching device through the medium-capacity optical link, the following codes are transmitted between ports in the same manner as in a conventional sequence; the OFL2 code, the UD2 code in response to the OFL2, and the UDR2 code in response to the UD2. Similarly, on the large-capacity optical link, the channel placed online first in the multiplexer channel device is used as the master channel, and the following codes are transmitted between the multiplexer ports; the OFL1 code, the UD1 code in response to the OFL1, and the UDR1 code in response to the UD1.

For a static port-to-port logical connection made between ports connected with the medium-capacity optical link, a control code passes through the switching device and initialization is performed between the nodes connected with the ports. When one or more ports in the multiplexer port device are connected statically, the multiplexer port and the destination port of the static connection perform link initialization for control code transmission and response in the same manner as for a dynamic connection. Both statically connected ports become idle on completion of initialization using a control code. For a frame received by the port which has become idle first, a port busy state indicating that the destination port is not yet connected is returned until the other port becomes idle, in the same manner as for a dynamic connection.

The switching device in the preferred embodiment employs a pseudo-static connection method in which a static port-to-port connection is established when both ports become idle. Therefore, when a port statically connected with the multiplexer port receives a control code from the medium-capacity optical link, it can respond to the control code as a port and also the other logical channel paths in the multiplexer port can operate intact. Further, when the control code received from the medium-capacity optical link includes a request for logical path release, the switching device in the preferred embodiment notifies a change in the logical path state upon receiving the control code as in a dynamically connected port, thereby allowing a relevant channel in the destination multiplexer channel device in connection with the multiplexer port to perform logical path release.

When the link becomes idle and ready to transfer frames, association between each channel in the multiplexer channel device and each port in the multiplexer port device is carried out using the DID and SID fields in the frame format A 100 shown in FIG. 5. In this operation, link address acquisition processing indicated in the ICTL field is performed for a frame in the frame format A 100 corresponding to an ALA (acquire link address) frame on the ACONARC channel interface. A logical channel path between a channel and port associated by the DID and SID fields forms a data transfer route in combination with the medium-capacity optical link connected with the switching device. Each of the multiplexed channels acquires an identifier of the destination node and sets up a logical path for an input/output device. A logical path between the channel and the input/output device is established according to a logical path setup procedure based on the connection-controlled frame transmission/reception. As mentioned in the description of the connection control, a full bandwidth of the medium-capacity optical link and a transfer capacity of the large-capacity optical link which can be allocated to logical channel paths are ensured by means of a logical connection, thereby making it possible to establish a plurality of logical paths for each logical channel path on the large-capacity optical link.

In initial resetting of the host computer, the channel placed online first in the multiplexer channel device serves as a master channel and carries out link initialization using the primitive control codes to acquire a link address. Master channel link address acquisition is performed with the multiplexer port device of the input/output device when the switching device or the multiplexer port device of the switching device is not used. For link addressing on the multiplex link, the DLA and SLA in the frame format A 100 are determined, and for the logical channel path connection, the DID and SID are associated.

On multiplexed channels other than the master channel, initialization is performed for each channel according to frame transmission/reception processing required for the DID-SID association. Further, on all of the channels including the master channel, frame transmission/reception is performed to acquire a destination node identifier and set up a logical path.

At any time other than initial resetting of the host computer, a channel is placed online first in the multiplexer channel device according to a channel online instruction given from a service frame console or operating system. This channel serves as a master channel and carries out link initialization as mentioned above. Until this channel is placed offline, it remains serving as the master channel. Master channel alteration occurs only when the current master channel is placed offline. If there are plural active online channels in the multiplexer channel device, mastership is given to the lowest-numbered channel.

When all of the channels in the multiplexer channel device are offline, i.e., when no channel is placed online or there is no active online channel for taking mastership from the current master channel to be placed offline, the OFL1 primitive control code may be issued on the multiplex link or the optical output may be switched off.

The switching device in the preferred embodiment is capable of controlling the large-capacity multiplex link as a single link in link initialization using the master channel function mentioned above. Further, without being conscious of the large-capacity multiplex link, each channel including the master channel can set up a logical channel path as in an individual independent interface. It is therefore possible to easily establish a switching connection with the conventional medium-capacity link.

The structure of a physical channel path table according to a preferred embodiment is described next with particular reference to FIG. 6. In a computer system, a unique physical channel number is assigned to each physical channel device connected therewith. The physical channel path table shown in FIG. 6 indicates an arrangement wherein 512 channels are connected with the computer system.

In FIG. 6, the physical channel path table provides four-byte data to each of the physical channels numbered from '0' to '1FF' (hex). Table information allocated to one physical channel comprises PCONF, SCONF, PTYPE and CHPID.

The PCONF indicates a physical configuration in the system, which includes bits I, E and F, plus other reserved (r) bits. The reserved bits are used, and those not related to the present invention are also included. Bits I, E and F indicate installation status, enable status and offline status of each channel device. That is, bit I indicates whether a channel path corresponding to each physical channel path number is installed physically in the system, bit E indicates whether the channel path is enabled in the system, and bit F indicates whether the channel path is offline or online.

Bit I is updated at the time of initial resetting of the system and hot-line connection/disconnection of each channel device package. When channel devices are installed, plural bits I are set to '1'. When the multiplexer channel device in the preferred embodiment is installed, four consecutive physical channels are set to '1'. Bits E and F are updated at the time of initial resetting and in response to a service frame console instruction. Bit F can also be updated from an operator console through the operating system. When '1' is set at bit E only for the lowest-numbered channel in the multiplexer channel device, the multiplexer channel device can serve as a single channel path to allow data transfer at high throughput. Execution of this operation is however determined depending on multiplexer port device conditions such as switching device connection, etc.

The SCONF contains system configuration information that is prepared by CHPID-based configuration information managed by the operating system in the computer system. For example, the SCONF contains information on channel operation mode types such as conventional parallel-channel EL/BY mode, serial-channel CNC/CTC/CVC mode, etc.

The PTYPE has a TYPE field for indicating a physical type of channel device. This field contains a TYPE code corresponding to a particular physical channel device installed for an interface driver, i.e., a channel device supporting the parallel interface, a channel device supporting the conventional serial medium-capacity optical interface, a channel device supporting the serial large-capacity optical interface, etc.

The CHPID indicates a channel path ID assignment in the system for each channel device having a physical channel number. The CHPID corresponds to a logical channel path number from a viewpoint of the operating system. Any channel path ID can be assigned which is unique as a logical channel number with respect to physical channel arrangement. This floating CHPID assignment function is used in many conventional applications, and it is intended to improve system availability through minimization of an adverse effect on computer system operation by assignment of different identifiers depending on the kinds of operating systems or by assigning a CHPID of a faulty channel to an unused channel path on occurrence of a persistent channel fault. In the physical channel path table shown in FIG. 6, it is checked whether a valid CHPID can be assigned in combination with PCONF and PTYPE information.

Since the multiplexer channel device in the preferred embodiment is contained in a channel package including an optical interface driver connected with the large-capacity optical interface, the channel package of the multiplexer channel device is physically different from a conventional channel package containing an interface driver on each channel for the medium-capacity optical interface. Therefore, although a unique code is assigned in the TYPE field of the PTYPE information, it is necessary to arrange the channels in the multiplexer channel device so that they appear equivalent to those on the medium-capacity optical interface from a viewpoint of the operating system. Therefore, in the SCONF field, the same setting as for each channel on the medium-capacity optical interface is made for the channel operation mode type, etc.

Conventionally, a channel operation mode type is defined for each channel path on the operating system, and a type of channel device is uniquely recognized using the path type only. For detection of a wrong configuration definition or a mismatch of the path type due to a wrong installation of a channel device, the actual channel device is scanned at the time of initial resetting, a channel path enable operation or a changeover to the online state. Through this scanning, channel device information that is read-out is compared with relevant channel path type configuration information to detect a wrong configuration definition or a mismatch of the path type as an error. Particularly, when a channel device package is added pursuant to an installation, the error detection scanning is performed at the time of the channel path enable operation or changeover to the online state. Therefore, the overhead time required for error detection processing is relatively significant to primary processing.

In the preferred embodiment, the PTYPE information is contained in the physical channel path table to reduce the channel device information scanning time which occupies the majority of the error detection processing time, thereby making it possible to substantially decrease the channel path enable processing or online changeover processing time. Actually, it is only necessary to carry out the required processing for the channel device information scan operation at the time of adding the package for an installation, and the overhead time related to the manual work can be ignored. When a channel path is placed online, it is only necessary to check the physical channel path table.

In accordance with the present embodiment, four channel lines between channel and switching devices can be replaced with a single high-speed serial interface line. In a typical mainframe computer system having as many as 256 channels, 512 channels or more, the present invention can reduce the number of system input/output cables significantly.

For increasing the entire system processing performance to meet enhanced CPU performance, it is required to improve the input/output processing performance using existing input/output devices. For this purpose, it is most practicable to increase the number of channels, and alternate channel paths since improvement in the availability also contributes to an increase in the number of channels. In the present embodiment, high-speed channel input/output interfacing can be provided for conventional channels, and also the number of system input/output cables can be reduced by using just channel or port device replacement involving minimum alteration in a computer system, i.e., without modification of an operating system and conventional input/output devices.

In the preferred embodiment wherein the number of channel input/output interface links is reduced by means of channel or port multiplexing, system availability is not affected adversely if alternate path links in alternate channel path arrangements are provided through careful examination.

Since the multiplexer channel device and multiplexer port device in the preferred embodiment can be implemented at low cost easily by replacement or addition of devices in an installation of each circuit package in an existing facility, system function expansion can be made while continuing (without stopping) host computer system operation. High-level compatibility with conventional input/output interfaces and enhanced link utilization in data transfer can be realized by using the large-capacity link and the multiplexer-channel-path operation or single-channel-path operation.

As set forth hereinabove and according to the present invention, input/output data transfer on a plurality of input/output interface cables can be integrated into data transfer on a single serial input/output interface cable using high-capacity interface multiplexer channel paths, thereby making it possible to substantially reduce the number of input/output interface cables required for a computer system.

Further, as mentioned hereinabove and according to the present invention, there is provided an input/output data transfer system which permits using conventional input/output devices as they are without modification and does not require modification in conventional input/output operational sequence of an operating system in integration of input/output interface cables, and which allows using program resources including an operating system available in an existing computer system intactly without the need for adding high-cost repeaters and modifying input/output devices on a large scale for protocol conversion.

Still more, as mentioned hereinabove and according to the present invention, there is provided a low-cost input/output data transfer system using a packet multiplexing interface on a basis of transfer data framing, which is advantageous in that hundreds of input/output interface lines per system can be realized at a low cost, having interface protocol compatibility with existing program resources to eliminate possible cost for program modifications, allowing a computer system to exploit its full capabilities using a small number of channels with high-performance channel devices, and making it possible to reduce the number of system channels while utilizing existing input/output devices without modification thereof.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description and all changes which come within the meaning and range of equivalency of the claims are therefore intended to be embraced therein.

We claim:

1. An input/output data transfer system for transferring data among data processing devices and/or input/output devices, comprising:

said data processing devices having channel devices and said input/output devices having port devices;

an optical-fiber serial interface link connecting said data processing devices and said input/output devices;

wherein said channel devices include a multiplexer channel device that multiplexes plural channel paths for an operating system using said optical fiber serial interface link, and said port devices of said input/output devices include a multiplexer port device that multiplexes plural ports of said input/output devices;

whereby frame-multiplexing data transfer is performed between said multiplexer channel device and said multiplexer port device of said input/output devices on said optical fiber serial interface link selectively in one of a multiplex channel path mode and a high speed single channel path mode.

2. An input/output data transfer system according to claim 1, wherein the number of channel paths to be multiplexed on said optical fiber serial interface link is limited to a multiplex level, wherein the data transfer capacity of said optical fiber serial interface link is not exceeded by the product of a data transfer capacity of said channel devices and said multiplex level for connections between said channel devices of said data processing devices and said port devices of input/output devices, and wherein a plurality of logical connections are established on each of the multiplexed channel paths.

3. An input/output data transfer system for transferring data among data processing devices and/or input/output devices, comprising:

said data processing devices having channel devices and said input/output devices having port devices and an optical fiber serial interface link connecting said data processing devices and said input/output devices;

a switching device for dynamically switching data transfer paths between said channel devices and said input/output devices;

said channel devices including a multiplexer channel device that multiplexes plural channel paths and said switching ports of said switching device including a multiplexer port device that multiplexes plural ports of said input/output devices;

a first capacity serial interface having a first bit rate capacity for performing frame-multiplexing data transfer between said multiplexer channel device and said multiplexer port device of said switching device;

a second bit rate capacity serial interface for connecting said port devices of said input/output devices and switching ports of said switching device, wherein said first bit rate capacity exceeds said second bit rate capacity; and said ports of said input/output devices having a multiplexer port device, wherein said multiplexer channel device and said multiplexer port device of said input/output device are selectively used in one of a single channel path mode and a multiplex channel path mode by an operating system to establish a data transfer connection between said multiplexer channel device and said multiplexer port device of said input/output device on said optical fiber serial interface link.

4. An input/output data transfer system according to claim 3, wherein the number of channel paths to be multiplexed on said first capacity serial interface is limited to a multiplex level, wherein the data transfer capacity of said first capacity serial interface does not exceed the product of a data transfer capacity of said second capacity serial interface and said multiplex level of said first capacity serial interface.

5. An input/output data transfer system for transferring data among data processing devices and/or input/output devices, comprising:

said data processing devices each having a plurality of channel paths having and at least one multiplexer channel device for multiplexing a plurality of said channel paths to provide plural physical channel paths, said multiplexer channel device including a channel specific microprocessor having channel path control circuits for each of said channel paths;

said input/output devices having port devices including at least one multiplexer port device;

said at least one multiplexer channel device being linked to said at least one multiplexer port device by an optical-fiber serial interface link having a first bit rate capacity that is greater than a second bit rate capacity of said channel paths;

whereby frame-multiplexing data transfer is performed between said at least one multiplexer channel device and said at least one multiplexer port device of said input/output devices selectively in one of a multiplex channel path mode and a single channel path mode on said optical fiber serial interface link.

6. An input/output data transfer system according to claim 5, wherein said at least one multiplexer channel device has an external interface protocol control circuit for performing protocol control on said optical fiber serial interface link, a multiplex/distribution control circuit for multiplexing data to be sent/received between a logically partitioned data transfer buffer for each channel path control circuit and the external interface protocol control circuit, and a link connection control circuit, wherein frame-multiplexing data transfer is performed through said optical fiber serial interface link, and said link connection control circuit provides single channel path compatibility with conventional connection control by setting up plural logical connections corresponding to respective channel path control operations.

7. An input/output data transfer system according to claim 5, wherein one of said channel path control circuits in said at least one multiplexer channel device comprises a buffer pointer usable for a total capacity of the data transfer buffers in the multiplexer channel device, and data transfer is performed in a high-speed single channel path mode using a full transfer capacity bandwidth of said optical fiber serial interface link.

8. An input/output data transfer system according to claim 5, wherein the input/output transfer system includes a master channel discrimination circuit that identifies one of said channel path control circuits for sending/receiving primitive control codes necessary for link initialization on said optical fiber serial interface link connected with said at least one multiplexer channel device, wherein a microprogram running on said channel specific microprocessor having the one channel path control circuit recognizes a master channel, and only the master channel sends/receives said control codes.

9. An input/output data transfer system according to claim 8, further comprising said master channel discrimination circuit and a link error detector circuit for recognizing a link error on all the channel path control circuits in the multiplexer channel device, wherein on occurrence of a link error on said optical fiber serial interface link, only the master channel sends/receives primitive control codes necessary for link recovery, and all of the other channel path control circuits report occurrence of the link error to the operating system for channel paths and instruct the operating system to collect logout of fault information.

10. An input/output data transfer system according to claim 8, wherein in said master channel discrimination circuit, a channel path placed online first in said at least one multiplexer channel device is used as a master channel, and mastership is given to a lowest-numbered one of said channel paths that are active channel paths when the master channel is placed offline, and further wherein the optical link is placed offline only when there are no active channel paths for taking mastership.

11. An input/output data transfer system according to claim 5, wherein said optical fiber serial interface link includes a first optical link of a first capacity and a second optical link of a second capacity, and further including:

a switching device having a plurality of switching ports including a multiplexer port device multiplexing a plurality of the physical ports, whereby said second optical link connects said port devices of said input/output devices and switching ports of said switching device and said first optical link performs frame-multiplexing data transfer between said at least one multiplexer channel device and said multiplexer port device of said switching device.

12. An input/output data transfer system according to claim 11, wherein said switching device further includes an external interface protocol control circuit for conversion between a protocol on said first optical link and a protocol on said second optical link, an internal switch interface and means for sending frames received by said multiplexer port through the internal switch interface to the external interface protocol control circuit on a basis of frame multiplexing, means for converting frames received through said first optical link under direction of the external interface protocol control circuit and acquiring address information corresponding to an internal port number of the switching device from header information of each received frame, a data transfer buffer circuit for receiving frames for each port, a multiplex/distribution control circuit for multiplexing and distributing frames to be transferred by each port, and a connection control circuit for forming plural logical channel paths to said multiplexer channel device connected through the first optical link and establishing each connection on each logical channel path.

13. An input/output data transfer system according to claim 11, further comprising means for checking whether a port-to-port connection in the switching device is dynamic or static using internal interface connection control information in the switching device, means for recognizing said multiplexer port device using port device installation information in the switching device, and means contained in the switching device for judging that a port-to-port connection is in a pseudo-static connection state, and sending/receiving primitive control codes for port operations including link initialization and link fault recovery as for a dynamic port-to-port connection, such that frames on the internal switch interface are transferred in the same manner as for a static connection.

14. An input/output data transfer system according to claim 11, further comprising at least one of said input/output devices having a memory control unit with input/output ports and a multiplexer port device multiplexing a plurality of the input/output ports, and an external interface protocol control circuit for performing protocol control on said first optical link, a data transfer buffer circuit having logical partitions on a channel path basis for each memory control unit input/output port, and a multiplex/distribution control circuit for multiplexing data to be transferred with the external interface protocol control circuit, wherein frame-multiplexing data transfer is carried out through said first optical link, and a connection control circuit is used for setting up plural logical connections for each channel path on said at least one multiplexer channel device.

15. An input/output data transfer system according to claim 14, wherein in one of said input/output devices, said multiplexer port device comprises a buffer pointer usable for a total capacity of the data transfer buffers in the multiplexer port device, and data transfer is performed in a high-speed single channel path mode using a full transfer capacity bandwidth of said first optical link.

16. An input/output data transfer system according to claim 11, further including a physical channel path information table for checking whether a single channel path is connected with the switching device through the second optical link for a channel path recognized and controlled by the operating system or whether said at least one multiplexer channel device is connected with the switching device through the first optical link, wherein the contents of the physical channel path information table can be changed from a service processor console according to multiplexer channel installation conditions with reference to the operating system configuration information and physical channel path information table, and a mismatch between the actual physical interface connection information and the operating system configuration information is reported to the service processor.

17. An input/output data transfer system according to claim 16, further comprising:
    means for analyzing link error logout information corresponding to each channel path, wherein on occurrence of a link fault on the first optical link having multiplexed logical channel paths, a faulty location can be indicated through identifying a relevant optical link as single link according to said physical channel path information table.

18. An input/output data transfer system according to claim 5, wherein said optical fiber serial interface link is a single serial input/output interface cable and further wherein said input/output devices are conventional input/output devices used in said input/output data transfer system without modification except for the addition of said multiplexer port device, which an operating system views as a single physical channel.

* * * * *